United States Patent [19]

van der Wal et al.

[11] Patent Number: 4,459,370

[45] Date of Patent: Jul. 10, 1984

[54] PROCESS FOR THE PREPARATION OF AN IRON(III) OXIDE CATALYST OR ABSORBENT

[75] Inventors: Willem J. J. van der Wal, Utrecht; John W. Geus, Bilthoven, both of Netherlands

[73] Assignee: VEG Gasinstituut N.V., Apeldoorn, Netherlands

[21] Appl. No.: 404,703

[22] Filed: Aug. 4, 1982

[30] Foreign Application Priority Data

Aug. 7, 1981 [DE] Fed. Rep. of Germany ....... 3131255

[51] Int. Cl.$^3$ ............................................. B01J 23/74
[52] U.S. Cl. .................................. 502/338; 502/258; 502/336; 502/406
[58] Field of Search ........................... 252/459, 466 J; 502/258, 325, 336, 338, 406

[56] References Cited

U.S. PATENT DOCUMENTS

| | | | |
|---|---|---|---|
| 2,777,823 | 1/1957 | Rottig | 252/459 |
| 3,404,099 | 10/1968 | Steinmetz | 252/466 J |
| 3,840,479 | 10/1974 | Geus | 252/466 J |
| 4,190,560 | 2/1980 | Geus et al. | 252/459 |

FOREIGN PATENT DOCUMENTS 1767202  3/1971  Fed. Rep. of Germany .

Primary Examiner—W. J. Shine
Attorney, Agent, or Firm—Mandeville and Schweitzer

[57] ABSTRACT

Process for the preparation of an iron(III) oxide catalyst or absorbent, in which the iron is precipitated from an iron salt solution by means of hydroxyl ions in the presence of a carrier, the charged carrier is dried and optionally calcined and optionally reduced, a solution of an iron(III) salt being introduced with vigorous stirring below the surface of the suspension of the carrier, the pH of the suspension is maintained between 4 and 7 and the charged carrier is separated from the solution.

4 Claims, 2 Drawing Figures

PROCESS FOR THE PREPARATION OF AN IRON(III) OXIDE CATALYST OR ABSORBENT

BACKGROUND AND SUMMARY OF THE INVENTION

The invention relates to a process for the preparation of an iron(III) oxide catalyst or absorbent, in which iron is precipitated from an iron salt solution by means of hydroxyl ions in the presence of a carrier, the carrier is dried and optionally calcined.

Catalysts are known, which contain finely divided iron or iron oxide on a carrier with a large surface area. As a rule, heat-stable substances, such as silicon dioxide, aluminum oxide or titanium oxide are used as carrier for the catalytically active particles of iron oxide or iron. The carrier must be thermally stable. Such catalysts are particularly important in the synthesis of ammonia and the preparation of liquid fuels from carbon monoxide by the Fischer-Tropsch process. In the previous century already, it was discovered that finely divided iron oxide is a very effective absorbent for hydrogen sulfide. The fact that iron oxide does not absorb carbon dioxide in noticeable amounts makes it very suitable for the removal of hydrogen sulfide. The regeneration of the loaded-up iron oxide by oxidation is carried out at elevated temperatures. The sulfur, produced by the regeneration, is separated. High temperatures are required for the regeneration, especially when it is carried out in situ in the reactor and must therefore be finished in the shortest possible time. However, in so doing, any iron oxide, not on a carrier, sinters very rapidly. The distribution of the iron oxide on a thermally stable carrier with a sufficiently large surface area is therefore an essential requirement for the use of iron oxide as an absorbent for hydrogen sulfide.

A process for the preparation of a catalyst, whose catalytically active substance may be iron oxide, is known from the German Pat. No. 1,767,202. According to this process, the carrier is suspended in a finely divided form in a dilute solution, which contains the iron ions, and the iron oxide is precipitated with heating and prolonged, intensive stirring owing to the fact that hydroxyl ions are formed continuously and homogeneously in the solution. In this manner, a catalyst is obtained, in which the active component is precipitated in the form of extremely small particles or as a thin continuous layer on the surface of the carrier.

Absorbents, which are used for the removal of contaminants from gas streams, must fulfill essentially the same requirements as catalysts containing a carrier. A large thermally stable surface of the carrier and small particles or a thin, continuous layer of the active component are essential in order to achieve a rapid conversion or absorption of the material to be absorbed, which is present as a rule as a contaminant in a gas mixture. Small particles of the active component are also essential for a sufficiently rapid regeneration.

The application of iron or iron oxide with a very small particle size on a carrier is difficult. This is recognized, inter alia, by the fact that catalysts for the synthesis of ammonia are prepared in essentially the same manner as about 60 years ago. According to this process, magnetite and a small amount of aluminum oxide are fused. A technically difficult and expensive grinding process produces particles of the desired size and, after reduction, iron particles with a diameter of 40 to 50 nm are obtained on the aluminum oxide, which acts as carrier.

In the German Pat. No. 1,767,202 already referred to above, it is mentioned that precipitation of iron(III) oxide in the presence of a suspended carrier does not lead to the desired dispersion. It is therefore proposed in this patent that iron(II) oxide be precipitated from a homogeneous solution on the surface of a carrier suspended in the solution. Although excellent results are obtained by this process, it has two disadvantages. Special precautions are required in order to keep iron(II), because iron(II) is readily oxidized to iron(III). For this reason, the solutions used must previously be freed from dissolved oxygen. In addition, the desired addition of iron(II) requires a prior determination of the iron content of the iron(II) solution, which is prepared by dissolving metallic iron in a nonoxidizing solution. In order to avoid oxidation, a certain proportion of metallic iron must be used in excess.

A different difficulty arises from the fact that finely divided silicon dioxide carriers are strongly attacked by the precipitation of iron(II) ions. The silicon dioxide reacts with the iron(II) forming iron(II) hydrosilicate. This is recognized by the noticeable increase in the specific surface area of the carrier. Loading finely divided silicon dioxide with iron(II) in a weight ratio of 1:1 when carrying out the process of the German Pat. No. 1,767,202 leads, for example, to an increase in the surface area of the silicon dioxide from 380 to 500 $m^2/g$. Although an increase in the specific surface area of the carrier material is generally advantageous, the iron (II) hydrosilicate itself is, as a rule, not active as a catalyst or absorbent. If the hydrosilicate is to be converted into metallic iron, a reduction must be carried out at a high temperature. Similarly, the conversion of iron oxide requires calcining at high temperatures. As a rule however, such a treatment at high temperatures leads to a decrease in the active surface area and eliminates at least partly the advantage of the precipitation process.

The present invention is based on the aim of avoiding the disadvantages described above and of finding a process, according to which an iron (III) oxide catalyst or absorbent can be prepared in a simple manner.

The object of the present invention is therefore a process for the preparation of an iron(III) catalyst or absorbent, in which the iron is precipitated from a solution of an iron salt by means of hydroxyl ions in the presence of a carrier, the loaded carrier is dried and optionally calcined, and which is characterized by the fact that a solution of the iron(III) salt is introduced with vigorous stirring below the surface of the suspension of the carrier and the pH of the suspension is maintained between 4 and 7, and that the loaded carrier is separated from the solution. As confirmed by Comparison Experiment 1, a precipitate is admittedly obtained initially in the form of small particles, when the pH is considerably above 7. However, these small particles ball together to larger agglomerates. During the subsequent heat treatment, calcining or reduction, these agglomerates sinter rapidly and form larger iron (oxide) particles with a smaller specific surface area and a considerable shrinkage of the catalyst or absorbent.

When the pH of the iron(III) salt solution is increased starting from a value of 2, compounds with more than 2 iron ions in the molecule are formed at a pH of about 2. When the pH is increased further, the oligomeric iron-(III) compounds coagulate and do not react to a noticeable extent with the carrier. Surprisingly, it was discovered that the formation of iron(III) oxide hydrates at pH values above 4 leads to compounds, which interact with the suspended carrier. The result is that the iron(III) reacts with the surface of the carrier and adheres firmly to it.

It appears that FeOOH is precipitated at a pH of about 6, while amorphous, hydrated iron(III) oxide is obtained at lower pH values.

An examination of the catalysts or absorbents, prepared according to the process of the invention, with the electron microscope revealed that the densest distribution of particles containing iron(III) was obtained when working at pH values between about 5.5 and 6.5. In the inventive process therefore, the pH of the suspension is preferably maintained between about 5.5 and 6.5.

It was discovered that the size of the particles of hydrated iron oxide can be recognized by the color of the loaded carrier. When the particles are extremely small, the color is light brown, even when the carrier is highly loaded. When larger particles are present, the color is brown, even if there is little load on the carrier.

The introduction (the injection) of the iron(III) solution is accomplished advisably through a tube, which discharges below the surface of the suspension. A continuous flow of iron(III) salt solution should be maintained, in order to achieve a rapid and uniform dispersion. A reaction between the suspension liquid and the iron(III) solution in the injection tube, where the liquid cannot be stirred, should be avoided.

If the suspension is maintained at a temperature above about 70° C., it may happen that gas bubbles enter the injection tube. These gas bubbles can lead to a situation in which the suspension is introduced into the injection tube, which should be prevented. Therefore, when the suspension temperature is about 70° C., either a water-cooled injection tube and/or a very thin injection tube should be used, in order to prevent entry of gas bubbles.

The rate of addition of iron(III) solution and the extent of stirring the suspension must be matched to each other. At high injection rates, the suspension must be stirred correspondingly very vigorously, advisably while using baffles and/or effective stirrers.

The pH can be maintained by producing hydroxyl ions continuously in the suspension by a chemical reaction, which it itself is known. This production takes place simultaneously with the addition of the solution of the iron salt. A suitable process is the hydrolysis of urea at elevated temperatures, such as that described, among others, in the German Patent No. 1,767,202. If the preparation is to be carried out at low temperatures, the hydrolysis of cyanate can be used. Cyanate ions react according to the following equation:

$$CNO^- + 3H_2O \rightarrow NH_4^+ + 2OH^- + CO_2$$

This reaction takes place at about 35° C. The rate of injection of the solution of the iron salt must of course be adapted to the formation of the hydroxyl ions and to the maintenance of the pH in the desired range. Alternatively, the concentration of the material supplying the hydroxyl ions and/or the temperature can be adapted to the desired rate of injection. A very simple process consists of introducing an alkali solution simultaneously (through a separate inlet tube) into the suspension, which is stirred vigorously. The rate of injection of the solution of the iron salt and the rate of addition of the alkali solution are controlled in such a manner, that the pH remains in the desired range. This can be accomplished, for example, by measuring the pH of the suspension continuously and controlling the addition of the solution of iron(III) salt and optionally of the alkali solution by means of regulating and control elements in such a manner, that the pH of the suspension is maintained in the desired range.

As carrier, heat-stable carriers can be used inventively, which are customarily employed for catalysts, e.g. silicon dioxide, aluminum oxide, magnesium oxide, zirconium dioxide, titanium oxide, crystalline or amorphous aluminum silicate zeolites, mixed oxides of the aforementioned compounds and/or combinations thereof. The specific surface area of the carrier should be as large as possible, for example, at least greater than 10 m²/g and preferably greater than 100 m²/g.

As iron salt solutions, for example those of iron(III) nitrate or chloride in water are used.

If the catalyst is to be used in the reduced state, the danger of poisoning by sulfur exists in many areas of application. In such cases therefore, it is not advisable to use iron sulfate.

The concentration of the iron(III) salt solution may be in the range of 1 to about 0.01 moles per liter. If the concentration is in the upper range, stirring must be carried out very carefully and the injection must be carried out very slowly, in order to produce a rapid and uniform dispersion. A thin inlet tube is then appropriate. With appropriate care, the upper limit for the concentration can however be about 2, and the lower limit about 0.001 moles per liter.

The load on the carrier can vary within wide limits from about 70 weight percent to about 1 weight percent, calculated as the metal of the active component and based on the weight of the carrier. The size of the iron (oxide) particles obtained depends on the concentration of the solution of the iron(III) salt and on the extent of stirring the suspension, as well as on the specific surface area of the carrier. In general, it is advisable that the carrier be loaded with more than 5 weight percent of metal of the active component, based on the weight of the carrier.

The concept of "iron(III) oxide", as defined in the present invention, is understood to include also hydrated oxides, as is known to those who are expert in this field.

EXAMPLE 1

Figure 1:
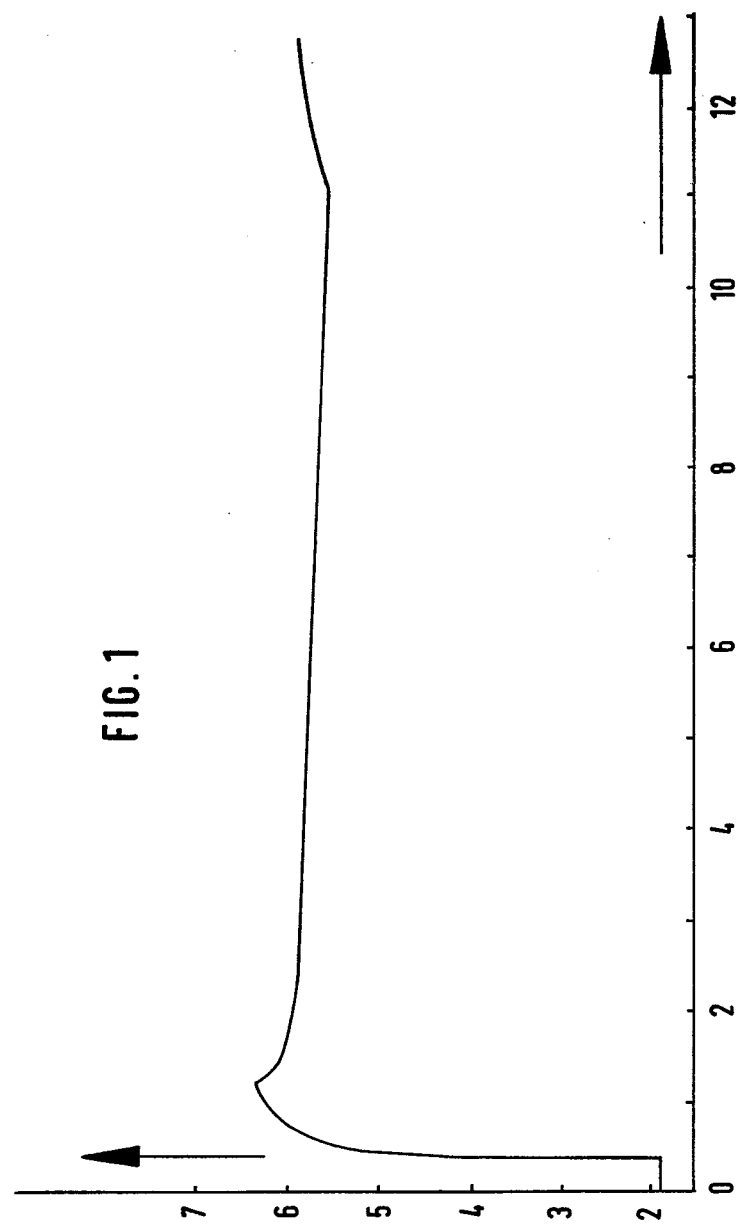
FIG. 1 shows the pH of the solution of Example 1 plotted against time.

Potassium cyanate (10 g) was dissolved in 750 mL of deionized water and 5 g of finely divided silicon dioxide (AEROSIL, registered trademark), with a specific surface area of 380 m²/g, were then suspended in this solution. The temperature of the solution was then raised to 38° C. In the attached FIG. 1, the pH (ordinate) is plotted against time (abscissa). From this, it can be seen that the pH after about 30 minutes was 6.3

At this pH, the injection of the iron(III) nitrate solution was started below the surface of the suspension, which was stirred vigorously. The iron(III) nitrate solution was prepared by dissolving 5 g of Fe(NO₃)₃·9H₂O in 250 mL of deionized water. It can be seen from FIG. 1 that the pH dropped to about 5.9 immediately after the addition of the iron salt solution. During the injection the pH gradually dropped to 5.7. The addition of the iron(III) nitrate solution was accomplished within about 9 hours. At the end of the addition, the pH immediately commenced to rise. The loaded carrier, which had a light brown color, deposited rapidly. It was separated from the liquid, washed and dried for 24 hours at about 120° C. The weight ratio of iron to silicon dioxide was 1:4. The iron content was about 20 weight percent.

The X-ray diffraction diagram of the dried material shows greatly broadened bands at the places for $\alpha$-FeOOH. When the material was heated in air or in an inert gas to 800° C., it lost water. This finely divided iron(III) oxide on the carrier reacted at room temperature with the moisture of the atmosphere, forming $\alpha$-FeOOH. The X-ray diffraction diagram showed maxima, which had hardly become sharper by heating the loaded carrier for 4 hours to 800° C.

Ultrathin sections of the embedded material, as well as material dispersed on a carbon film, were examined by a transmission electron microscope. In so doing, very small particles of iron oxide were observed, with a diameter of about 4 nm.

COMPARISON EXPERIMENT 1

Potassium cyanate (40 g) was dissolved in 750 mL of deionized water and 50 g of the finely divided silicon dioxide, used in Example 1, were then suspended in the solution. The temperature was raised to 38° C. Within 30 minutes, the hydrolysis of the cyanate led to an increase in the pH to 6.5. The pH was subsequently raised to 9.0 by the addition of a solution of potassium hydroxide. The injection of an iron(III) nitrate solution below the surface of the suspension was then commenced. The solution contained 30 g of $Fe(NO_3)_3 \cdot 9H_2O$ in 250 mL of deionized water. The solution was injected during 14 hours. As a result of the injection, the pH dropped rapidly to 7.3, where it was maintained.

The loaded carrier deposited well. It was separated from the liquid, washed and dried at 120° C. The dried material showed no X-ray diffraction spectrum. After heating for 4 hours at 800° C., a material was obtained with the sharp diffraction maxima of $\alpha$-$Fe_2O_3$. During this high-temperature treatment, the volume of the loaded carrier shrank considerably. The detectable volume decreased by a factor of about 3. The material, obtained as described in Example 1, showed no shrinkage.

An examination of the material, dried at 120° C., with the help of an electron microscope showed the presence of very small, clustered (agglomerated) iron oxide particles.

COMPARISON EXAMPLE 2

The same finely divided silicon dioxide, used in Examples 1 and 2, was activated by the process of the German Pat. No. 1,767,202 in that hydrated iron(III) oxide was precipitated by homogeneously increasing the pH of the solution by the hydrolysis of urea at 90° C. The reaction, with the formation of compounds which contained more than 1 iron ion per molecule, could be followed by measuring the intensity of light transmitted through the solution. In order to carry out this measurement, no carrier was suspended in the solution in a separate experiment.

Figure 2:
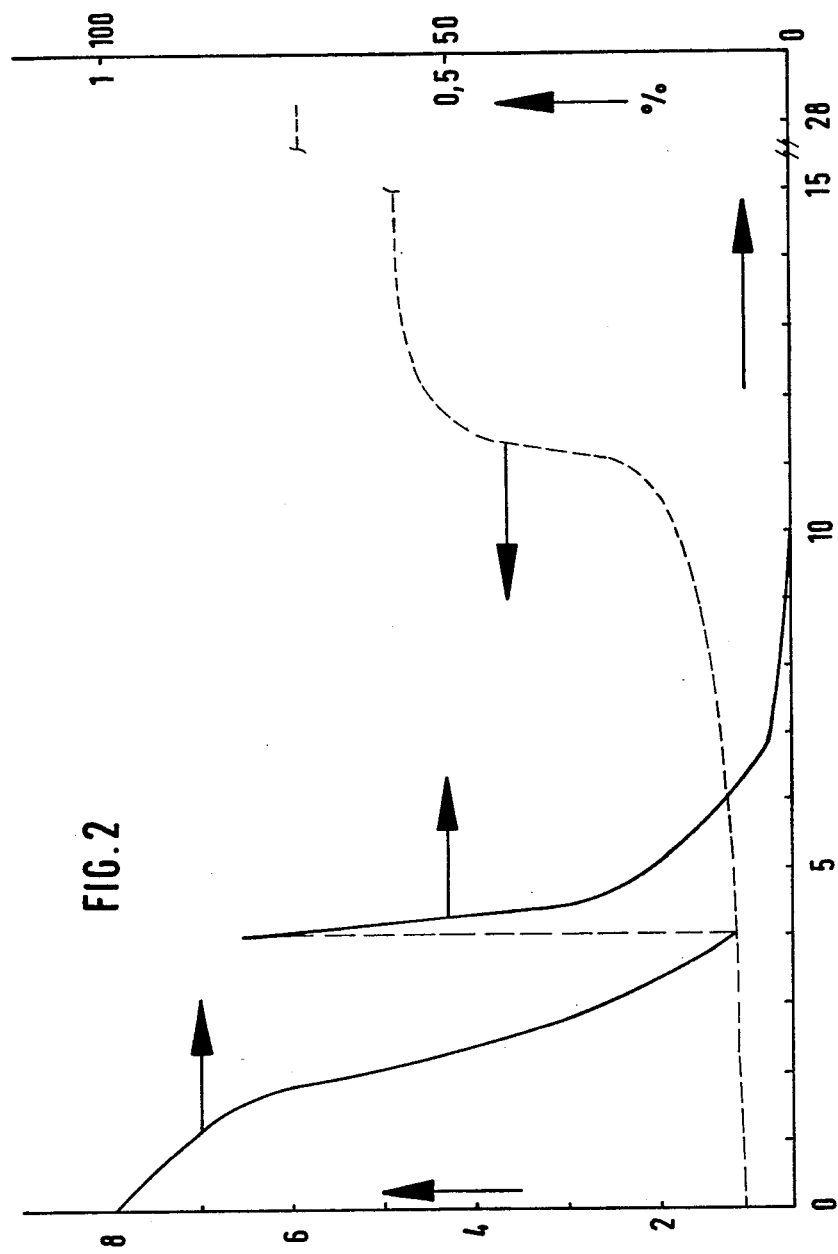
FIG. 2 shows the pH and the intensity of transmitted light for a solution described in Example 2 plotted against time.

In FIG. 2, the numbers on the left ordinate represent the pH and those on the right ordinate the intensity of the transmitted light, expressed as a percentage. The time in hours is plotted on the abscissa, the time between 15 and 28 hours being omitted by the obvious amount at the place indicated.

The curves drawn were recorded as a function of time during the hydrolysis of urea at 90° C. The dashed line represents the pH values.

The solid line represents the values of the intensity of the transmitted light, the left portion of the solid line up to the vertical dashed line applying to the range from 0 to 100% (these values are recorded to the right of the right ordinate). It is evident from the curve that the intensity decreases from 100% to about 5% in the period from 0 to 4 hours. The solid line is then continued to the right of the vertical dashed line, the numbers from 0 to 1%, recorded to the left of the right ordinate, being applicable for the light intensity. It is evident that the intensity decreases from 1% to 0% during the period from 4 to 28 hours.

It is evident from these values that the hydrolysis commenced at a pH of about 1.0. The decrease in the intensity of the transmitted light and the essentially constant pH value during the first 10 hours indicate the formation of very small particles of compounds with more than 1 iron(III) atom. The particles must have been exceedingly small at this stage, since no deposit could be detected. The flocculation of the very small iron(III) particles took place in the step, in which the pH increased from 2 to about 4.

When the finely divided silicon dioxide was added to the solution, essentially the same pH/time curve was measured. An examination with the electron microscope revealed the presence of very small, clustered, hydrated, iron(III) oxide particles, which were deposited as clusters next to the carrier and did not form a layer of very small particles on the carrier.

We claim:

1. Process for the preparation of an iron (III) oxide catalyst or absorbent comprising:
   (a) introducing a solution of an iron (III) salt with vigorous stirring below the surface of a suspension having hydroxyl ions and a carrier,
   (b) maintaining the pH of the suspension between 4 and 7,
   (c) iron being precipitated from solution by means of said hydroxyl ions,
   (d) separating the charged carrier from the solution, and
   (e) drying the charged carrier.

2. Process according to claim 1, characterized by the fact that the pH of the suspension is maintained between 5.5 and 6.5.

3. Process according to claims 1 or 2, characterized by the fact that hydroxyl ions are continuously produced in the suspension by a chemical reaction.

4. Process according to claims 1 or 2, characterized by the fact that the pH of the suspension is measured continuously and that the addition of the iron(III) salt solution and optionally of the alkali solution is controlled by means of a regulating and control element, so that the pH of the suspension is maintained in the desired range.

* * * * *